(12) United States Patent
Hoover et al.

(10) Patent No.: US 11,267,105 B2
(45) Date of Patent: Mar. 8, 2022

(54) UNIVERSAL PART GRIPPER USING 3-D PRINTED MOUNTING PLATE

(71) Applicant: XEROX CORPORATION, Norwalk, CT (US)

(72) Inventors: Linn C Hoover, Webster, NY (US); Jeffrey J Bradway, Rochester, NY (US); Erwin Ruiz, Rochester, NY (US); Paul M Fromm, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 336 days.

(21) Appl. No.: 16/539,213

(22) Filed: Aug. 13, 2019

(65) Prior Publication Data

US 2019/0358784 A1 Nov. 28, 2019

Related U.S. Application Data

(63) Continuation of application No. 15/477,439, filed on Apr. 3, 2017, now abandoned.

(51) Int. Cl.
| | |
|---|---|
| *B25B 11/00* | (2006.01) |
| *B41J 3/407* | (2006.01) |
| *B33Y 10/00* | (2015.01) |
| *B33Y 30/00* | (2015.01) |
| *B29C 64/20* | (2017.01) |
| *B29C 64/00* | (2017.01) |

(52) U.S. Cl.
CPC ............ *B25B 11/005* (2013.01); *B29C 64/00* (2017.08); *B29C 64/20* (2017.08); *B33Y 10/00* (2014.12); *B33Y 30/00* (2014.12); *B41J 3/4073* (2013.01)

(58) Field of Classification Search
CPC ...... B25B 11/005; B29C 64/20; B41J 3/4073; B41J 3/40731; B41J 3/40733
See application file for complete search history.

(56) References Cited

U.S. PATENT DOCUMENTS

| | | | |
|---|---|---|---|
| 7,740,349 B2 | 6/2010 | Tezuka et al. | |
| 9,690,274 B1 | 6/2017 | Markov et al. | |
| 9,827,784 B1 | 11/2017 | Buchar et al. | |
| 2003/0202095 A1 | 10/2003 | Schultz | |
| 2012/0306987 A1 | 12/2012 | Kim | |
| 2014/0300675 A1 | 10/2014 | Miller et al. | |
| 2015/0085006 A1 | 3/2015 | Nick et al. | |

*Primary Examiner* — Moshe Wilensky
*Assistant Examiner* — Kyle A Cook

(57) ABSTRACT

A generic holder includes a generic holder plate and a 3-D insert plate. The 3-D insert plate contains locating features mirrored to the backside of the part to be printed and vacuum grippers to secure the part in the insert plate. The insert plate is secured in the generic holder plate that includes vacuum couplings. The part is located on the insert plate and vacuum is applied to the generic holder plate and insert plate to hold the part for printing.

8 Claims, 5 Drawing Sheets

UNIVERSAL PART GRIPPER USING 3-D PRINTED MOUNTING PLATE

CROSS REFERENCE TO RELATED APPLICATIONS

This is a continuation of copending U.S. application Ser. No. 15/477,439, entitled UNIVERSAL PART GRIPPER USING 3-D PRINTED MOUNTING PLATE, filed Apr. 3, 2017 by the same inventors, and claims priority therefrom.

CROSS REFERENCE TO RELATED APPLICATIONS

Cross-referenced is commonly assigned U.S. application Ser. No. 15/477,125, filed Apr. 3, 2017, now US Publication No. 2018-028316 and entitled VACUUM TUBE OBJECT CLAMPING ARRAY WITH CONFORMABLE PADS by Timothy P. Foley et al; U.S. application Ser. No. 15/477,127, filed Apr. 3, 2017, now U.S. Pat. No. 9,925,726, and entitled APPARATUS FOR HOLDING DURING THREE-DIMENSIONAL (3D) OBJECTS DURING PRINTING THEREON by Jeffrey J. Bradway et al; U.S. Publication No. 2018-0282086 filed Apr. 3, 2017, and entitled UNIVERSAL PART GRIPPER WITH CONFORMABLE TUBE GRIPPERS by Linn C. Hoover et al; U.S. application Ser. No. 15/477,427, filed Apr. 3, 2017, now U.S. Pat. No. 10,279,456 and entitled SPRING LOADED SUCTION CUP ARRAY GRIPPER by Paul M. Fromm et al; U.S. Application Ser. No. 62/480,563, filed Apr. 3, 2017, and non-provisional issued as U.S. Pat. No. 10,087,020 and entitled UNIVERSAL OBJECT HOLDER FOR 3-D PRINTING USING A CONFORMABLE GRIPPER BALL by Erwin Ruiz et al; U.S. Publication No. 2018-0281199, filed Apr. 3, 2017, and entitled APPARATUS FOR GENERAL OBJECT HOLDING DURING PRINTING USING MULTIPLE CONFORMABLE BALLS by Jeffrey J. Bradway et al; U.S. Pat. No. 9,925,799, issued Mar. 27, 2018 and entitled AIR PRESSURE LOADED MEMBRANE AND PIN ARRAY GRIPPER by Paul M. Fromm et al; U.S. Publication No. 2018-0281464, filed Apr. 3, 2017, and entitled APPARATUS FOR REPEATABLE STAGING AND HOLDING OBJECTS IN A DIRECT TO OBJECT PRINTER USING AN ARRAY OF PINS by Jeffrey J. Bradway et al; and U.S. Pat. No. 10,086,518, issued Oct. 2, 2018, filed and entitled SPRING LOADED IRIS MECHANISM STACK GRIPPER by Paul M. Fromm et al; all of which are included in their entirety herein by reference.

TECHNICAL FIELD

This disclosure relates generally to a system for printing on three-dimensional (3-D) objects, and more particularly, to an apparatus adapted for general object holding in a non-production environment.

BACKGROUND

Commercial article printing typically occurs during the production of the article. For example, ball skins are printed with patterns or logos prior to the ball being completed and inflated. Consequently, a non-production establishment, such as a distribution site, which customizes products, for example, in region in which potential product customers support multiple professional or collegiate teams, needs to keep an inventory of products bearing the logos of the various teams. Ordering the correct number of products for each different logo to maintain the inventory can be problematic.

One way to address these issues in non-production outlets would be to keep unprinted versions of the products, and print the patterns or logos on them at the distribution site. Adapting known printing techniques, such as two-dimensional (2-D) media printing technology, to apply image content onto 3-D objects would be difficult. Since the surfaces to be printed must be presented to the print heads as relatively flat, two-dimensional surfaces, the objects have to be maneuvered carefully to present portions of the articles as parallel planes to the print heads.

One printing system that accomplishes this is disclosed in copending and commonly assigned U.S. patent application Ser. No. 15/163,880, filed on May 25, 2016, now U.S. Pat. No. 9,827,784 and entitled SYSTEM FOR PRINTING ON THREE-DIMENSIONAL (3D) OBJECTS by Wayne A. Buchar et al. This printing system includes a plurality of print heads arranged in a two-dimensional array, each printhead being configured to eject marking material, a support member positioned to be parallel to a plane formed by the 2-D array of print heads, a member movably mounted to the support member, an actuator operatively connected to the movably mounted member to enable the actuator to move the moveably mounted member along the support member, an object holder configured to mount to the movably mounted member to enable the object holder to pass the array of print heads as the moveably mounted member moves along the support member, and a controller operatively connected to the plurality of print heads and the actuator, the controller being configured to operate the actuator to move the object holder past the array of print heads and to operate the plurality of print heads to eject marking material onto objects held by the object holder as the object holder passes the array of print heads. This application is included herein by reference for the practice of the present disclosure in its entirety.

A problem with this approach is that it requires a unique part holder for each part that is to be printed. The part holders are currently machined metal brackets with dedicated locating and fastening features machined into each holder. Productivity is impacted due to the time required to design and make a unique mounting plate and cost is a factor because the plate is not reusable. The customer experience is unsatisfactory because of the wait for a part to be made.

SUMMARY

In answer to this shortcoming, disclosed is a generic holder that includes a generic holder plate and a 3-D insert plate. The 3-D insert plate contains locating features mirrored to the backside of the part to be printed and vacuum grippers to secure the part in the insert plate. The insert plate is secured in the generic holder plate which includes vacuum couplings. The part is located on the insert plate and vacuum is applied to the generic holder plate and insert plate to hold the part for printing.

BRIEF DESCRIPTION OF THE DRAWINGS

The foregoing aspects and other features of a printing system that prints images on 3-D objects are explained in the following description, taken in connection with the accompanying drawings.

DETAILED DESCRIPTION

Figure 1:
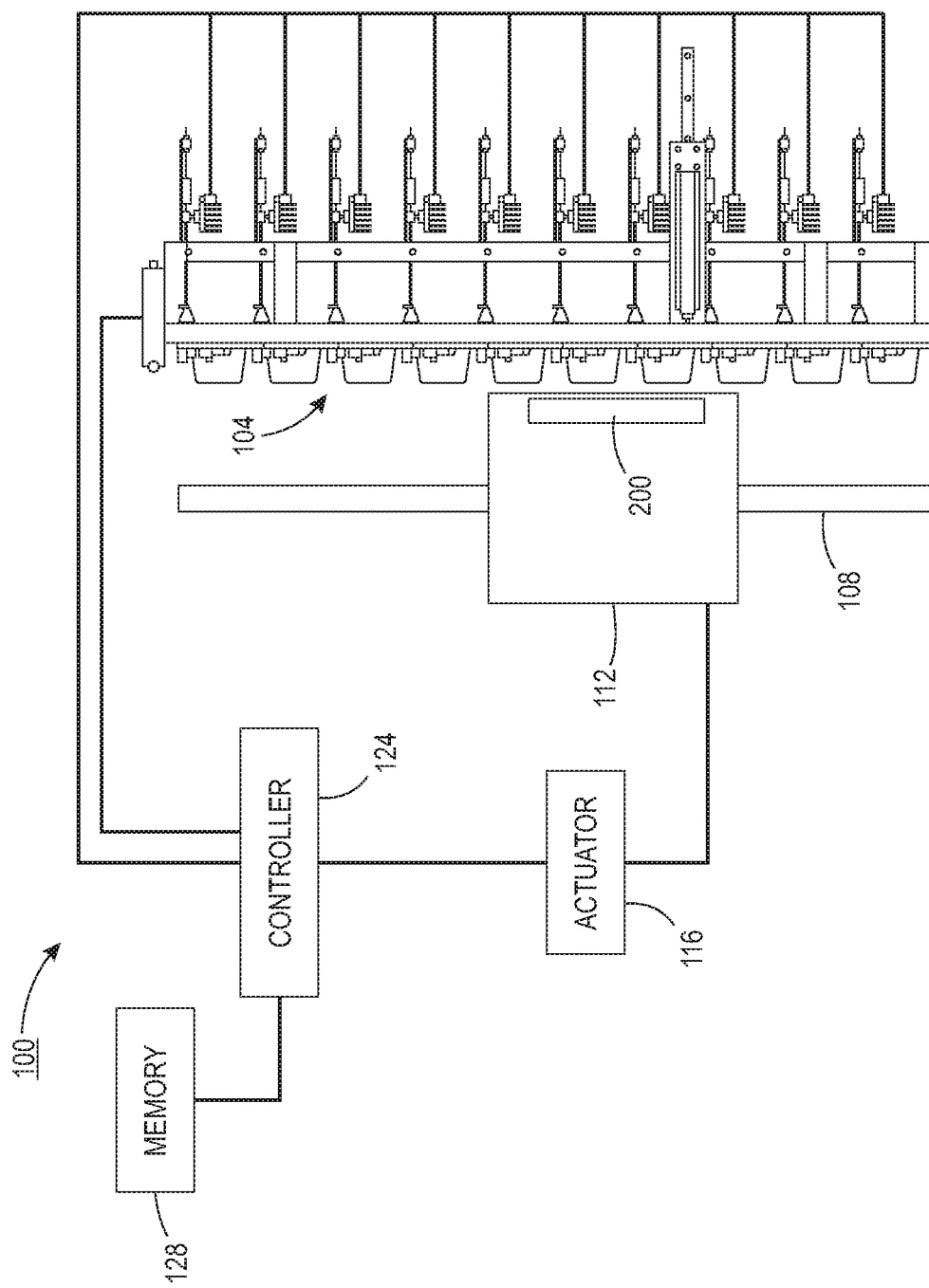
FIG. 1 illustrates an exemplary printing system 100 configured to print on a 3-D object.

For a general understanding of the present embodiments, reference is made to the drawings. In the drawings, like reference numerals have been used throughout to designate like elements.

FIG. 1 illustrates an exemplary printing system 100 configured to print on a 3-D object. The printing system 100 includes an array of print heads 104, a support member 108, a member 112 movably mounted to the support member 108, an actuator 116 operatively connected to the movably mounted member 112, a universal holder plate 200 configured to mount to the movably mounted member 112, and a controller 124 operatively connected to the plurality of print heads and the actuator. As shown in FIG. 1, the array of print heads 104 is arranged in a 2-D array, which in the figure is a 10×1 array, although other array configurations can be used. Each print head is fluidly connected to a supply of marking material (not shown) and is configured to eject marking material received from the supply. Some of the print heads can be connected to the same supply or each printhead can be connected to its own supply so each printhead can eject a different marking material.

The support member 108 is positioned to be parallel to a plane formed by the array of print heads and, as shown in the figure, is oriented so one end of the support member 108 is at a higher gravitational potential than the other end of the support member. This orientation enables the printing system 100 to have a smaller footprint than an alternative embodiment that horizontally orients the array of print heads and configures the support member, movably mounted member, and object holder to enable the object holder to pass objects past the horizontally arranged print heads so the print heads can eject marking material downwardly on the objects.

The member 112 is movably mounted to the support member 108 to enable the member to slide along the support member. In some embodiments, the member 112 can move bi-directionally along the support member. In other embodiments, the support member 108 is configured to provide a return path to the lower end of the support member to form a track for the movably mounted member. The actuator 116 is operatively connected to the movably mounted member 112 so the actuator 116 can move the moveably mounted member 112 along the support member 108 and enable holder 200 connected to the moveably mounted member 112 to pass the array of print heads 104 in one dimension of the two-dimensional array of print heads.

The controller 124 is configured with programmed instructions stored in a memory 128 operatively connected to the controller so the controller can execute the programmed instructions to operate components in the printing system 100. Thus, the controller 124 is configured to operate the actuator 116 to move the holder plate 200 past the array of print heads 104 and to operate the array of print heads 104 to eject marking material onto objects held by the generic holder 200 as the generic holder passes the array of print heads 104.

Figure 2:
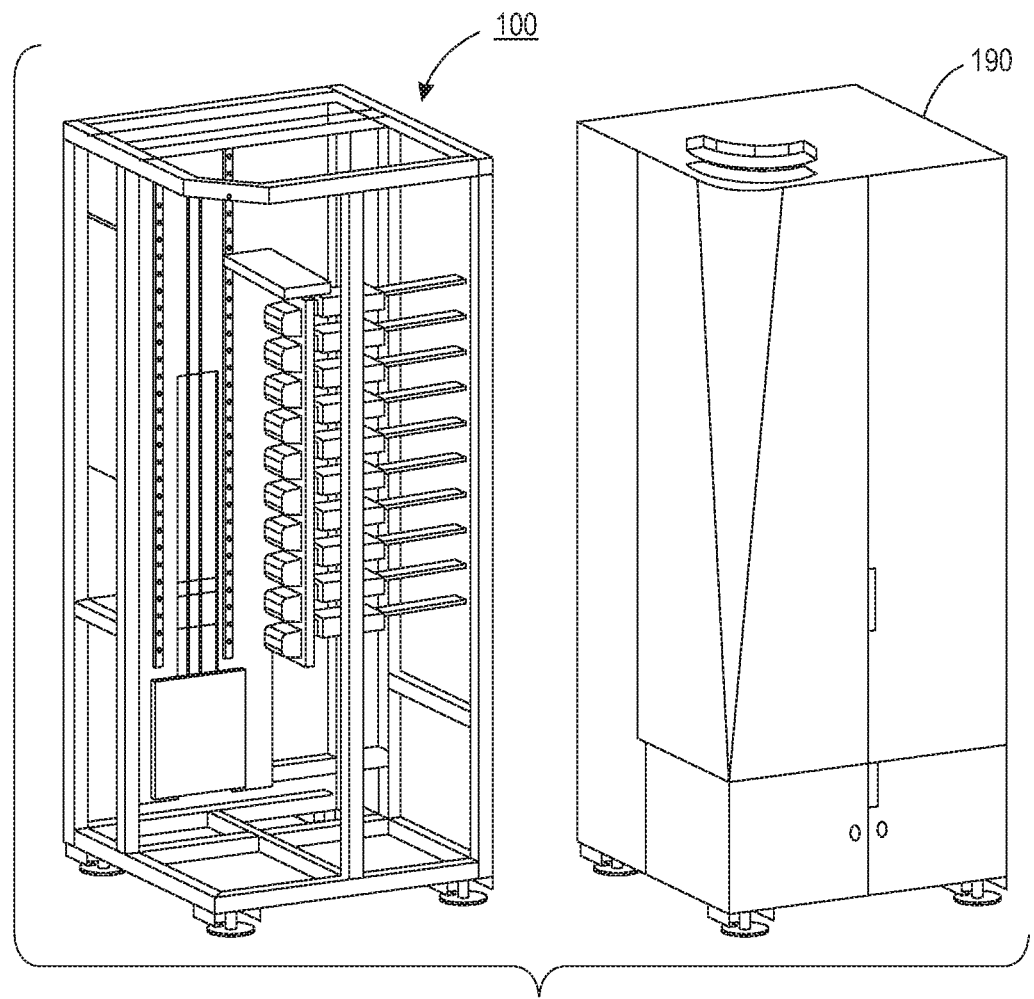
FIG. 2 depicts a cabinet within which the exemplary printing system 100 shown in FIG. 1 can be installed.

The system configuration shown in FIG. 1 is especially advantageous in a number of aspects. For one, as noted above, the vertical configuration of the array of print heads 104 and the support member 108 enables the system 100 to have a smaller footprint than a system configured with a horizontal orientation of the array and support member. This smaller footprint of the system enables the system 100 to be housed in a single cabinet 190, as depicted in FIG. 2, and installed in non-production outlets. Once installed, a generic part holder, as described further below, can be used with the system to print a variety of goods that are generic in appearance until printed.

Figure 3A:
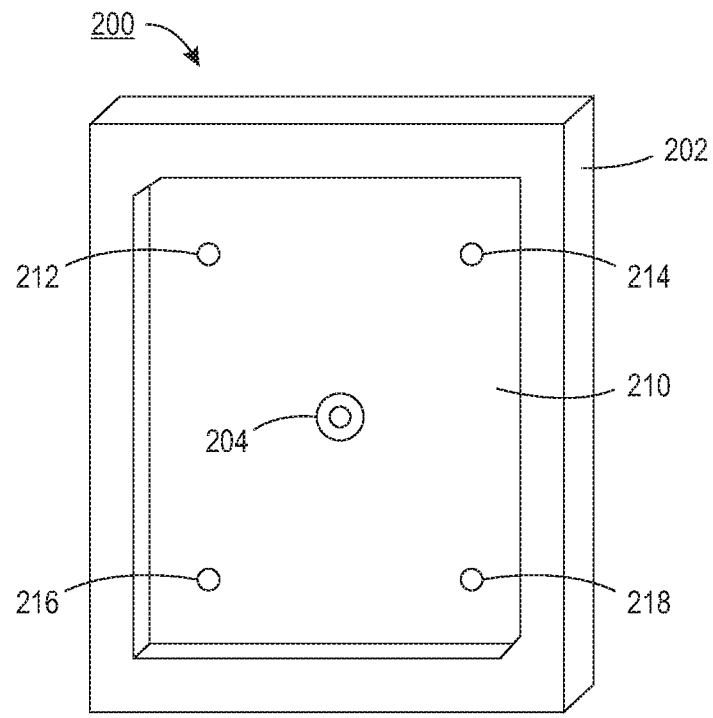
FIGS. 3A and 3B illustrate a generic holder plate and insert that can be mounted into the printing system in FIG. 1 in accordance with the present disclosure.

Turning now to the present disclosure, a generic holder 200 is shown in FIG. 3A that includes a frame member 202 and a generic holder plate 210. Generic holder plate 210 has a centralized vacuum port connection 204 surrounded by mounting points 212, 214, 216, and 218 that facilitate mounting different sized inserts. Mounting points 212, 214, 216, and 218 could be vacuum ports, if desired. This allows the insert size to be customized for the size and number of parts to be printed.

Figure 3B:
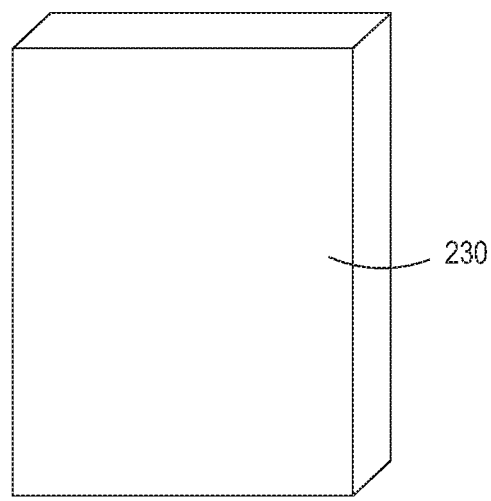
Figure 4A:
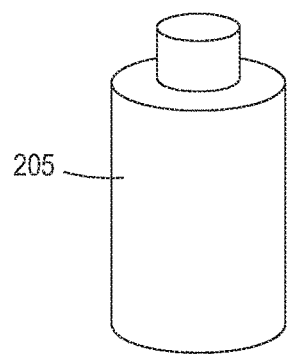
FIGS. 4A-4C depict the steps included in creating an insert plate of a part.
Figure 4B:
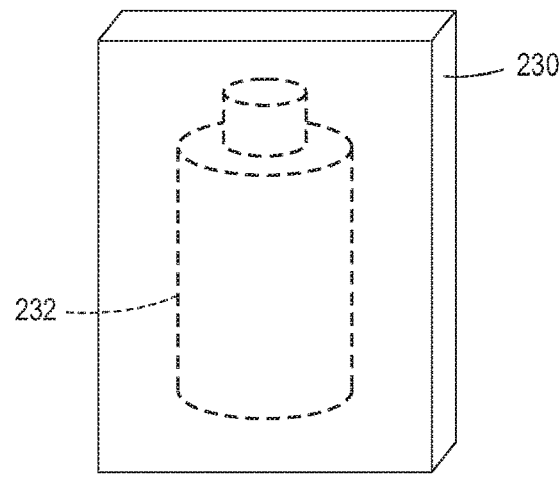
Figure 4C:
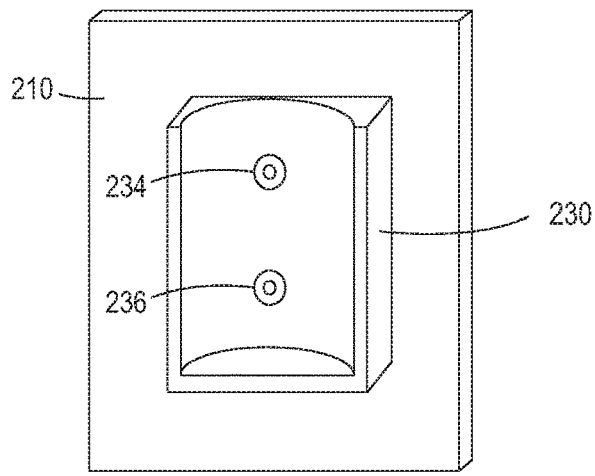

The process of converting blank insert 230 in FIG. 3B into the fully formed insert 230 in FIG. 4C and into which part 205 will be mounted include providing a part 205 in FIG. 4A and scanning part 205 using a 3-D scanner to create a solid model of the part. The geometry from the scanner is processed by conventional computer aided design (CAD) software, for example, ScanTo3D by SOLIDWORKS which in FIG. 4B overlays the part geometry 232 on the blank face of insert 230. The CAD software overlays part 205 with insert 230 geometry so that the front face of part 205 (print surface) is positioned in the correct orientation and distance from print heads 104 in FIG. 1. The CAD software then subtracts features located on a backside (non-[print side) of part 205 from the front face of insert 230. The CAD software also allows the operator to add additional locating features as need, as well as, opening for one or more vacuum grippers relative to the part size and features. Vacuum channel are added to the back of the insert to connect vacuum port(s) 204 in holder plate 210 to the vacuum grippers in the insert.

Figure 5:
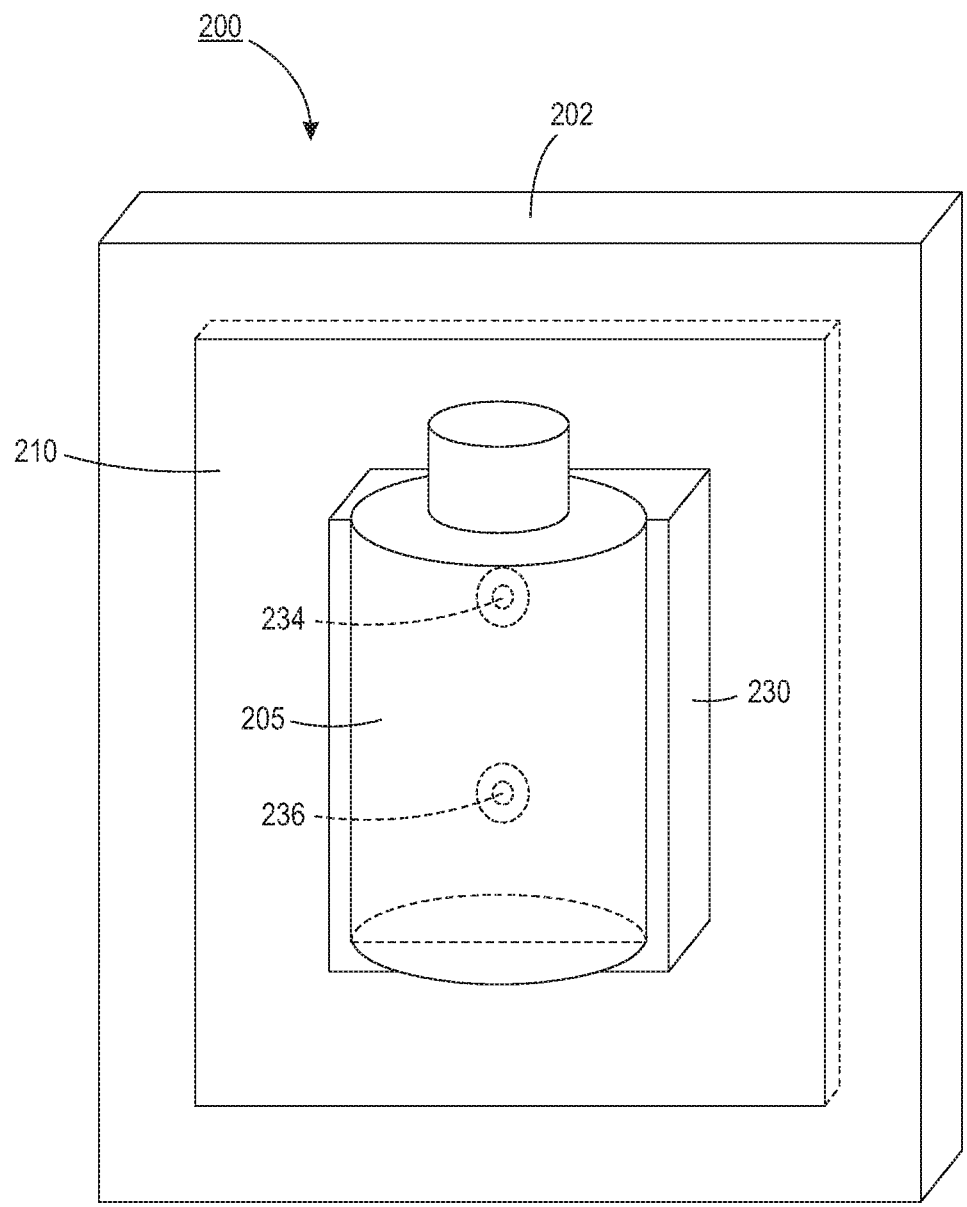
FIG. 5 shows the part in position within the insert and generic holder plate to receive printing.

Insert 230 is then printed on a 3-D printer. After the insert is cleaned, vacuum grippers 234 and 236 are placed into the insert as shown in FIG. 4C. The insert is mounted into holder plate 210 as shown in FIG. 5. The operator then places part 205 into the 3-D insert cavity in Insert 230 and applies vacuum to holder plate 210 to hold the part securely in insert 230 during the printing and ink curing processes. It should be understood that insert 230 can be produced either on site or off site using any conventional 3-D part fabrication technology.

In recapitulation, a universal part gripper for a direct-to-object printer includes a generic holder plate that is used to hold a variety of different size inserts that can be 3-D printed with location features to allow accurate positioning of the part with respect to the print heads. The 3-D printed insert is created by 3-D scanning the part to be printed on, then using CAD software to create a negative of the part into the insert, such that the printed area of the part is facing the correct direction and is the desired distance from the print heads. Also included in the insert are through-holes into which vacuum grippers are inserted to hold the part in place, and vacuum ports on the back mate up with the vacuum source on the generic holder.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for creating and using a generic part holder in holding a variety of part sizes and shapes while a part receives printing thereon from a printer, comprising:
    providing said part, said part capable of being non-rotatably secured to said generic part holder to receive printing thereon from said printer;
    providing only a single array of stationary printheads within said [3-D] printer;
    providing a frame member mounted on a vertical support member and configured for movement by said vertical support member within said [3-D] printer past said stationary printheads;
    fabricating an insert, wherein fabricating the insert comprises the steps of:
        providing a generic holder plate positioned directly within a recessed portion of said frame member, said generic holder plate including a sole centralized vacuum port connector;
        providing a blank insert, said blank insert including a front face, and wherein said sole centralized vacuum port connector of said holder plate facilitates mounting different sized inserts within said frame member;
        3-D scanning said part;
        using computer aided design software to create a negative of said part on said blank insert so that a front face of said part that is to receive print is positioned in a predetermined orientation and distance from printheads of said [3-D] printer;
        using said computer aided design software to subtract features located on a backside of said part from the front face of said blank insert;
        using said computer aided design software to add vacuum channels to said blank insert;
        using said computer aided design software to add openings in said blank insert;
    placing said insert within said frame member; and
    moving said support member past said array of printheads within said [3-D] printer in order for said part to receive images thereon.

2. The method of claim 1, including printing said insert using a 3-D printer.

3. The method of claim 2, including inserting vacuum grippers into said insert and connecting said vacuum grippers to said sole centralized vacuum port connector.

4. The method of claim 1, wherein said frame member mounted on said vertical support member is non-rotatable capable of being non-rotatably secured to said vertical support.

5. The method of claim 4, wherein said frame member mounted on said vertical support member is movable only in a vertical plane.

6. The method of claim 5, wherein said part has a non-truncated shape.

7. The method of claim 6, including moving said part only in a vertical plane.

8. The method of claim 7, including placing said part within said insert before moving said support member past said array of printheads within said printer.

* * * * *